US008281976B2

(12) United States Patent
Caizza et al.

(10) Patent No.: US 8,281,976 B2
(45) Date of Patent: Oct. 9, 2012

(54) METHOD OF MAKING MULTI-COMPONENT COMPOSITE METALLIC TUBE

(75) Inventors: Anthony Caizza, Palm Coast, FL (US); Antonio Esposito, Hopkinsville, KY (US); William Van Geertruyden, Bethlehem, PA (US); John DuPont, Whitehall, PA (US)

(73) Assignee: Plymouth Tube Co., Hopkinsville, KY (US)

( * ) Notice: Subject to any disclaimer, the term of this patent is extended or adjusted under 35 U.S.C. 154(b) by 40 days.

(21) Appl. No.: 12/558,237

(22) Filed: Sep. 11, 2009

(65) Prior Publication Data

US 2011/0062217 A1    Mar. 17, 2011

(51) Int. Cl.
*B23K 20/08* (2006.01)
(52) U.S. Cl. .......................... 228/107; 228/2.5; 72/253.1
(58) Field of Classification Search .................. 228/107, 228/141.1, 155, 156, 265, 2.5; 72/253.1; 237/16, 19, 56, 57
See application file for complete search history.

(56) References Cited

U.S. PATENT DOCUMENTS

| | | | | |
|---|---|---|---|---|
| 3,463,599 A * | 8/1969 | Welty, Jr. | ........................... | 431/2 |
| 3,708,253 A * | 1/1973 | Lemelson | ...................... | 425/155 |
| 5,005,756 A * | 4/1991 | Muggeo et al. | ................ | 228/127 |
| 5,056,209 A * | 10/1991 | Ohashi et al. | ................... | 29/517 |
| 5,080,325 A * | 1/1992 | Dean, Jr. | ........................ | 251/368 |
| 5,261,591 A * | 11/1993 | Hardwick | ...................... | 228/107 |
| 6,242,112 B1 * | 6/2001 | Forsberg et al. | .............. | 428/679 |

* cited by examiner

*Primary Examiner* — Maria Veronica Ewald
*Assistant Examiner* — Megha Mehta
(74) *Attorney, Agent, or Firm* — Wood, Phillips, Katz, Clark & Mortimer (57) ABSTRACT

A method for forming a multi-component composite metallic tube, in particular, a bi-component metallic tube, comprises the steps of forming a coextrudable, multi-component billet including an inner component formed from a first metallic material, and an outer component formed from a second metallic material. Notably, explosive bonding is employed for bonding the first and second components to form a metallurgical bond at the interface thereof, thus forming the desired multi-component billet. The multi-component billet is subsequently heated, and coextruded to form a multi-component tubular structure, having a metallurgical bond at an interface between inner and outer layers of the composite metallic tube.

13 Claims, 5 Drawing Sheets

METHOD OF MAKING MULTI-COMPONENT COMPOSITE METALLIC TUBE

TECHNICAL FIELD

The present invention generally relates to formation of composite metallic tubing, including at least two bonded components, and more particularly to a method for forming a multi-component, composite metallic tube, including explosively bonding first and second components to form a multi-component billet, and thereafter coextruding the billet to form a composite tube. The materials from which the tubing is formed can be selected for desired corrosion resistant properties, with the tubing finding particular use in power generation applications, and proving particularly effective in mitigating corrosion fatigue-cracking in low NOx environments. Other applications include oil and gas processing, waste water handling, water desalinization, and other applications in which corrosion-resistance, and resistance to delamination attendant to thermal cycling are desired.

BACKGROUND OF THE INVENTION

Many industrial processes require the use of tubing which exhibits different qualities between the inside surface and the outside surface thereof, such as corrosion resistance. For such applications, the use of multi-component metallic tubing can be desirable, to provide the desired combination of corrosion-resistance and strength characteristics for the specific application. For such applications, corrosion-resistance and resistance to delamination are desired, particularly attendant to thermal cycling and/or heat transfer of the composite structure. Such materials find applications in boiler tubes for power generation, oil and gas processing, waste water handling, desalinization processes, and a wide range of similar applications where the multi-component nature of the tubing can be advantageously employed. U.S. Pat. No. 5,190,832; U.S. Pat. No. 5,324,595; U.S. Pat. No. 5,620,805; U.S. Pat. No. 5,940,951; U.S. Pat. No. 6,303,237; and U.S. Pat. No. 6,865,920, all hereby incorporated by reference, relate to composite tubular structures and their formation.

Heretofore, efforts to make such bi-metallic tubing have been limited. It is believed that the use of sintering processes are known, wherein a powered metal starting billet is canned, sintered, and hipped to produce a starting billet. This billet is then extruded to form a bi-metallic tubular structure. For example, see U.S. Pat. No. 5,056,209, hereby incorporated by reference.

The so-called weld overlay process is also quite common, and an accepted method to produce a nickel-based alloy metallurgically bonded to the exterior surface of a tube. This process is used frequently in connection with new boiler panel installations, and can also be done on-site to repair existing boiler panel installations.

It is recognized that both of these techniques known heretofore suffer from specific disadvantages. In connection with the extrusion process using a powdered metal or canned billet when producing carbon steel tubes with a stainless steel overlay, it is known that stainless steel alloys are inherently not as corrosion-resistant as nickel-based alloys. The bond strength between the two materials may be weak, which can have detrimental performance implications, particularly in those environments where thermal cycling is present. By the use of a canned billet, the metallurgical bond formed between the core material and the overlay results from the extrusion process, rather than from the billet forming process. Additionally, the production of a powdered or sintered billet can be labor-intensive and costly.

The weld overlay process also suffers from distinct disadvantages. Uneven surface thickness uniformity can create heat transfer problems, and undesirable residual stresses within the tubular structure. The welding process itself typically creates residual stresses. The weld overlay process is difficult to apply on existing installations, and is very costly to apply in both new and existing installations. Labor costs to effect the weld overlay process are expensive, and additionally, this process must be performed on-site by qualified professionals. In the case of a coal-fired power plant installation, the down time cost for the installation can be very significant.

The present invention is directed to a method of forming a multi-component, composite metallic tube, such as a bi-metallic tube for applications in power-generation, and other applications which require corrosion-resistant performance, and resistance to delamination attended to thermal cycling. Notably, the present method achieves a metallurgical bond within the multi-component structure to provide the necessary performance characteristics in a highly cost-effective fashion.

SUMMARY OF THE INVENTION

The present invention relates to a method of making a multi-component, composite metallic tube having a highly desirable combination of performance characteristics, including corrosion-resistance, and resistance to delamination, particularly attended to thermal cycling and heat transfer. Tubular components formed in accordance with the present invention find a wide range of applications, including use as boiler tubes for power generation, oil and gas processing, waste water handling, desalinization, and the like. Tubing formed in accordance with the present invention is particularly effective in mitigating corrosion fatigue-cracking in low NOx environments.

In accordance with the present invention, a method of forming a multi-component, composite metallic tube comprises the steps of forming an extrudable, multi-component billet by providing an inner component formed from a first metallic material, and an outer component formed from a second metallic material. The present method includes positioning the first component within the second component, and explosively bonding the first and second components to form a metallurgical bond at an interface of the components. The explosive bonding step preferably includes explosively bonding the outer component to the exterior of the inner component, preferably by positioning explosives exteriorly of the second component.

The method further comprises coextruding the multi-component billet to form a multi-component, composite metallic tube. The composite tube comprises an inner layer formed from the first metallic material, and an outer layer formed from the second metallic material. Notably, through coextrusion, the composite metallic tube is further formed with a metallurgical bond at the interface between the inner and outer layers of the composite metallic tube.

Thus, an enhanced metallurgical bond is formed at the interface between inner and outer layers through a combination of the explosive bonding of the multi-component billet, and the subsequent coextrusion of the billet into the desired tubular component.

Heating of the billet is effected to elevate the temperature of the billet prior to the coextruding step, with such heating preferably effected by induction heating of the billet.

Prior to coextrusion, the present method contemplates drilling an opening through the inner component of the multi-component billet, thus facilitating the coextrusion formation. It is within the purview of the present invention that the multi-component tube be formed with a generally cylindrical configuration, and the tube can be formed with at least one projection on the exterior of the outer layer of the composite metallic tube during the coextrusion step. For some applications, it can be desired to form a pair of diametrically opposed projections on the exterior of the outer layer during the coextrusion step.

Depending upon the specific application, the present method contemplates selecting the metallic material of the second, outer component of the billet to exhibit greater resistance to corrosion from combustion gases then the metallic material of the first, inner component of the billet. In current embodiments, it is contemplated that the multi-component metallic tube be formed in a bi-component configuration, with the first inner layer comprising the inner most layer of the tube.

The desired corrosion resistances for the second metallic material of the outer component can be achieved by providing this material in the form of a nickel-chromium alloy, while the first metallic material of the inner component comprises a carbon-based steel. While specific dimensional characteristics of the present multi-component tube can be varied while keeping with the principles disclosed herein, it is presently contemplated that a bi-component metallic tube embodying the principles of the present invention be provided with a second outer layer having a thickness which is between 1.0% to 5.0% of the diameter of the composite tube. Thus, the outer layer of the bi-component tube is in the nature of "cladding" metallurgically bonded to the inner tubular structure.

Other features and advantages of the present invention will become readily apparent from the following detailed description, the accompanying drawings, and the impendent claims.

DESCRIPTION OF THE PREFERRED EMBODIMENT

While the present invention is susceptible of embodiment in various forms, there shown in the drawings and will herein after be described a presently preferred embodiment, with the understanding that the present disclosures to be considered as an exemplification of the invention, it is not intended to limit the invention to the specific embodiment disclosed herein.

By way of background, there are many applications in which multi-component, including bi-component, metallic tubing structures are required. In the context of the power-generation industry, a number of techniques have been developed to comply with mandated reductions in NOx emissions, which have been identified as a primary contributor to acid rain, ozone formation, reduction in atmospheric visibility, and adverse impact on human health. Strategies to reduce NOx compounds are site-specific, and depend on variables such as fuel type, furnace geometry, and combustion of firing patterns. Most utilities now utilize low NOx burners, and staged combustion conditions to limit NOx levels in order to comply with Clean Air Act requirement.

While reduction of NOx emissions is highly desirable, several major operating problems associated with low NOx combustion have been identified, with one major problem involving water wall tube failures due to accelerated corrosion. Conventional boilers produce oxidizing environments such that ferritic steel is can form protective oxide scales that provide good resistance to corrosion and long service life. However, under low NOx operating conditions, the combustion gas is more reducing, and more corrosive sulfur-rich particles are deposited on the water wall. With the potential existence of both oxygen and sulfur in the gaseous environment, a mixed oxidant attack occurs. Furthermore, the addition of corrosive slag deposit can accelerate the corrosive attack even further.

In order to help avoid failures due to corrosion under low NOx combustion conditions, power-generation installations rely on the use of so-called weld overlay coatings. Studies have shown that commercial weld overlay, such as Alloys 622 and 33, UNS N06022, UNS R20033) can provide reasonable resistance to corrosion in these environments. Although other coating types are available (e.g., thermal spray and, chromium diffusion coatings) these generally do not provide the level of corrosion resistance required by this application. However, it has been recognized that weld overlay coatings are undesirably susceptible to corrosion-fatigue cracking in low NOx combustion environments. Research has shown that the dendrite cores in the overlay exhibit a minimum in alloying concentration due to the rapid solidification conditions associated with welding. It has been established that this form of microsegregation cannot be suppressed in nickel alloys deposited by arc welding processes, regardless of the welding parameters in associated solidification conditions. As a result, the corrosion rate is accelerated in these alloy depleted regions, and localized attack occurs at the dendrite cores. These localized penetrations form stress concentrations that eventually grow into full sized cracks under the influence of residual stresses from welding and service-applied stress.

The development of coextruded tubing technology offers a viable solution to this problem. By this approach, a multi-component i.e., bi-metallic, tube is formed with the inner material selected for mechanical requirements (e.g., strength, toughness, etc.) while the outer material is selected for surface properties (e.g., corrosion-resistance). Bi-metallic coextruded tubes provide an approach for minimizing or eliminating the primary factors (residual stresses, microsegregation, and weld ripple) that promote corrosion-fatigue in weld overlay coatings. Residual stresses are significantly reduced because the process does not require localized heating/cooling, and the fabrication temperatures are much lower than welding. In addition, alloys for the surface can be selected with a close match in coefficient thermal expansion (CTE) in the underlying tube, so that stresses due to CTE mismatch are minimized. Since the process does not require localized melting and re-solidification, microsegregation and weld ripple are substantially eliminated.

The importance of the present invention cannot be over emphasized. Power generation from coal represents a significant source of energy for the United States in particular, and remaining parts of the world in general. There are approximately fifteen hundred coal-fired power plants operating in the United States today. There is currently an estimated 250 years of coal reserves, and it currently accounts for approximately 40% of the nation's power production. Although the corrosion-fatigue problem discussed above occurs in existing coal-fired plants, the problem is also expected in newer plants. The U.S. Department of Energy is currently considering the design of ultra super critical coal-fired units that operate at higher temperatures and pressures for improved efficiency. Low NOx combustion technology is also envisioned for these new units. Thus, the low NOx conditions, combined with higher temperatures and pressures, will place even greater demand on the use of materials that are resistance to this form of failure.

It has been shown that corrosion-fatigue of weld overlay coatings is the primary cause of failure in ultra super critical coal-fired power plant boiler tubes, which prompts forced outages. The present invention specifically addresses the need to develop multi-component tubing that exhibits reduced corrosion fatigue, thereby reducing the frequency and duration of forced outages. Notably, tubular structures formed in accordance with the present invention maintain superior corrosion-resistance and low NOx combustion environments, while still presenting a cost-effective alternative.

Properly designed bi-material products exhibit an optimal combination of desired properties, while minimizing there restrictive properties. Co-extrusion of shapes in tubes is a manufacturing technique where an initial extrusion billet is composed of multiple materials that are concurrently extruded into a bonded product. Often, two different alloys of the same material are used to form a final, sound, composite product. Production of composites in this manner maximizes the benefits of the individual component materials. One alloy may be used in the form of a cladding in the final product, with the base material present to provide support and strength. Among the major benefits of using coextrusion to produce composite parts is that there is no need for any additional joining/bonding process to manufacture the final part. As the materials are deformed into a net or near net shape, they are concurrently metallurgically bonded. This desirably eliminates the need for processes such as fusion welding (overlays and joining) or mechanical joining (through the use of fasteners or adhesives).

Coextrusion of bi-component metallic materials presents issues that are not typically encountered when extruding a single material. Dimensional tolerances between the two materials are an important consideration, along with the strength of the bond at the interface of the materials, and the potential for greater amounts of scrap material. The continuity of the bond is an important consideration for bond strength and physical properties (corrosion-resistance, thermal conductivity, etc.) and therefore the development of transformation products between the two layers is an important factor to be considered, especially during hot coextrusion.

With the above design considerations in mind, the present invention is directed to a highly effective method for forming multi-component composite metallic tubular structures, in particular, a bi-component composite metallic tube. In significant distinction from techniques practiced heretofore, the present invention has been found to provide an enhanced metallurgical bond at the interface between inner and outer layers of the bi-component tubular structure. This is achieved by forming the desired metallurgical bond not only during the coextrusion formation of the tubular structure, but additionally during formation of a bi-component billet employed during the coextrusion process. Significantly, explosive bonding of the components from which the billet is formed effects formation of a metallurgical bond at the interface thereof, with the desired metallurgical bond between the inner and outer components maintained and enhanced attended to the subsequent coextrusion process.

Figure 1:
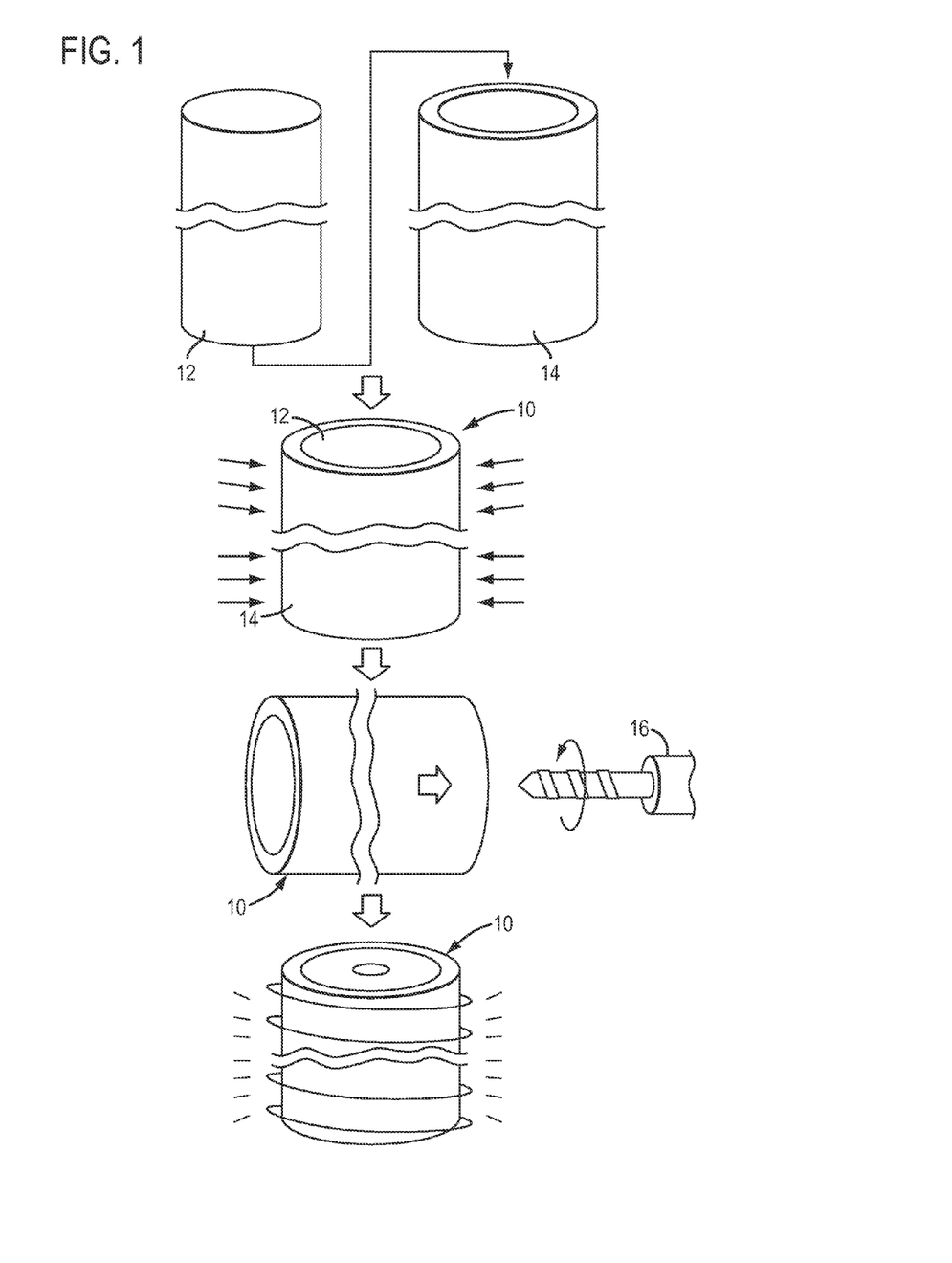
FIG. 1 is a diagrammatic flow chart illustrating preparation of a multi-component billet, prior to extrusion, for practicing the method of the present invention.

With reference to FIG. 1, therein are diagrammatically illustrated steps for practicing the present method of making a multi-component, composite metallic tube. Initial steps of the process entail formation of an extrudable, multi-component billet 10, which is subsequently coextruded for formation of the desired multi-component tube. To this end, a cylindrical, inner component 12 formed from a first metallic material, is positioned within a hollow, cylindrical outer component 14 formed from a second metallic material, with the second material typically selected to exhibit greater resistance to corrosion from combustion gases than the metallic material of the first, inner component. In particular, certain nickel-based alloys are preferred, particularly in view of their enhanced corrosion resistance in comparison to chromium-based stainless steel alloys.

As illustrated in FIG. 1, inner component 12 is positioned within outer component 14, and the composite assembly thereafter explosively bonded to form the bi-component billet 10. Explosive bonding is effected by positioning of explosive elements exteriorly of the second, outer component 14. By this explosive bonding technique, a metallurgical bond is formed at the interface of the inner outer components of the billet structure. Explosive bonding techniques are known in the art, such as exemplified by U.S. Pat. No. 3,314,139; U.S. Pat. No. 4,045,288; U.S. Pat. No. 5,261,591; and U.S. Pat. No. 5,259,547, all hereby incorporated by reference.

Figure 2:
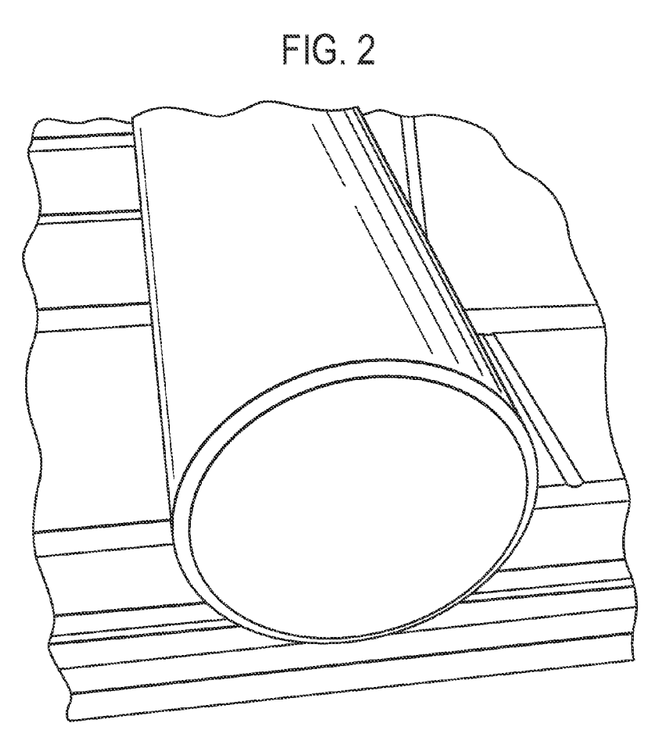
FIG. 2 is a photographic of a multi-component billet, comprising a bi-component billet, subsequent to explosive bonding.
Figure 3:
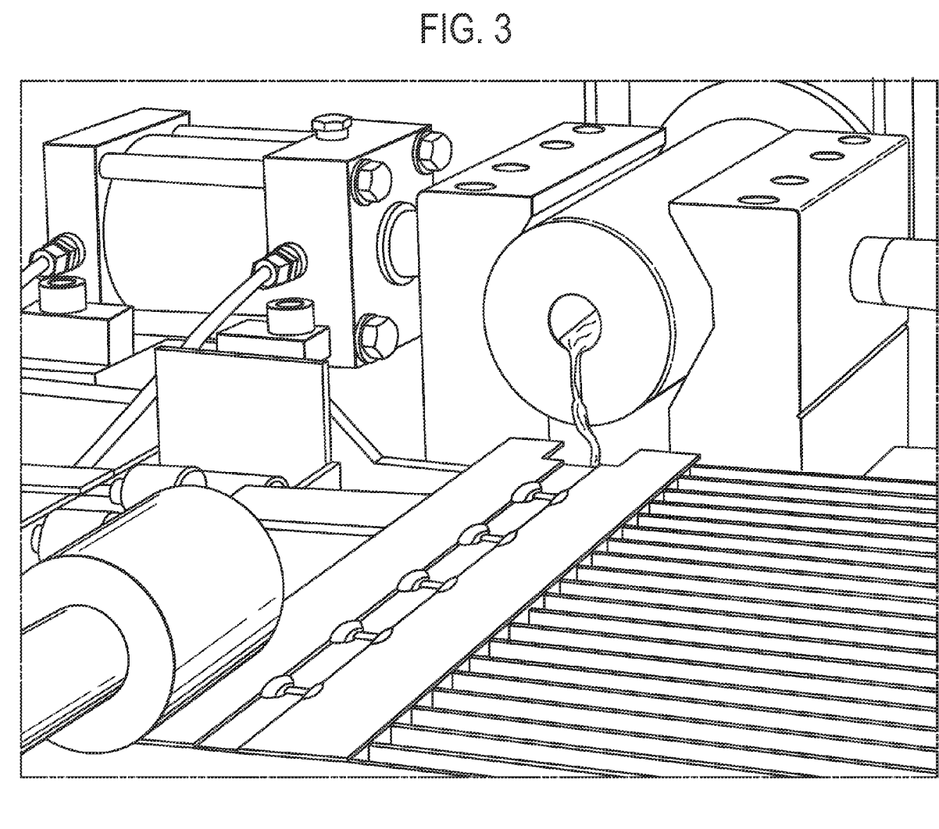
FIG. 3 shows drilling of a bi-component billet, prior to heating an extrusion.

FIG. 2 is a photograph illustrating a bi-component billet formed in accordance with the present invention.

As illustrated in FIG. 1, subsequent to explosive bonding of the billet 10, a cylindrical opening if formed through the inner component 12 of the billet 10 through use of drill 16. Formation of this opening in the billet facilities subsequent extrusion-formation of the desired bi-component metallic tubing.

Prior to coextrusion of the tubular structure, the temperature of the composite billet is elevated to the level necessary for extrusion. As illustrated in FIG. 1, induction heating of the composite billet facilitates efficient heating of the structure.

Coextrusion of the composite billet is effected after its temperature has been elevated to the desired level. In current practice, an extrusion apparatus capable of generating approximately 2,000 tons of extrusion pressure has been successfully employed.

Figure 4:
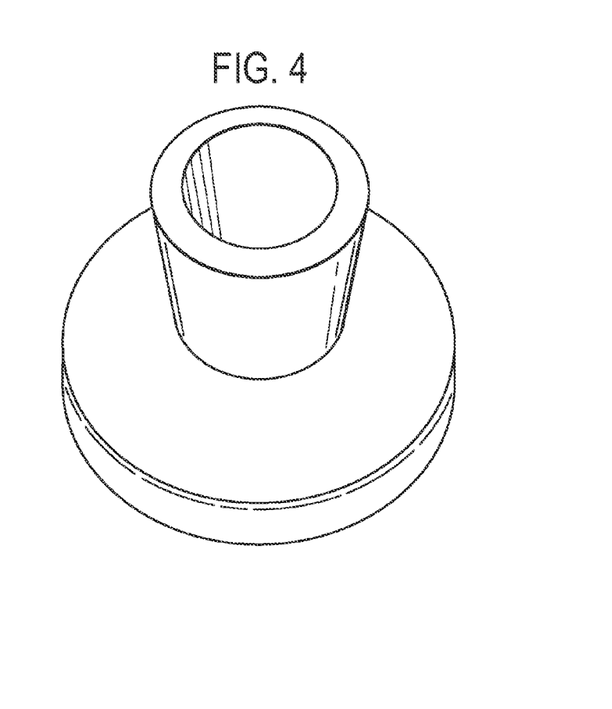
FIG. 4 is a photograph of an unused portion of a bi-component billet, showing a portion of which has been coextruded to form a bi-component metallic tube embodying the principles of the present invention.
Figure 5:
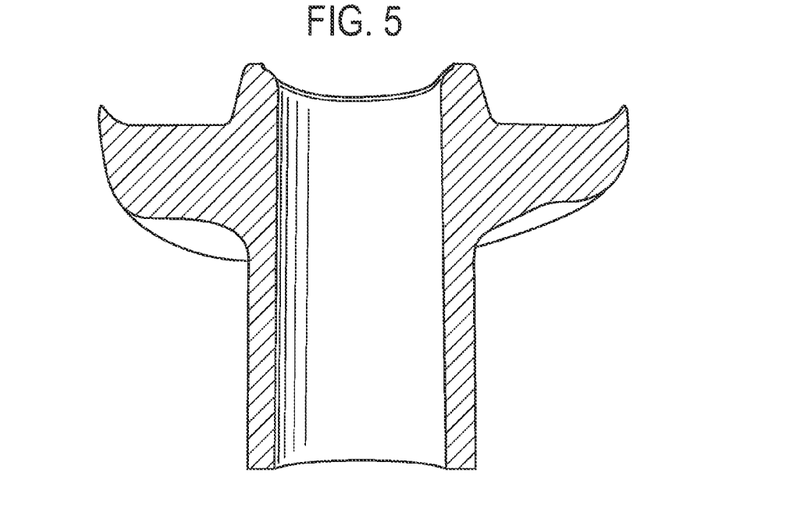
FIG. 5 is a cross-sectional view of the partial billet shown in FIG. 4.

FIG. 4 is a photograph illustrating a portion of a composite billet, subsequent to coextrusion, with a portion of a composite tube formed in accordance with the present invention projecting from the remaining portion of the billet. From this photograph, the cladded exterior of the composite tube can clearly be seen. While specific design parameters can be varied while keeping with the principles disclosed herein, it is presently contemplated that the cladding, or second outer layer of the composite tube have a thickness which is between about 1.0% to 5.0% of the diameter of the composite tube.

It is within the purview of the present invention to provide at least one projection, and preferably a pair of diametrically opposed projections, formed on the exterior of the outer layer of the composite metallic tube during the coextrusion step. This facilitates assembly of the composite tube in the final installation, such as a steam boiler or the like.

Figure 7:
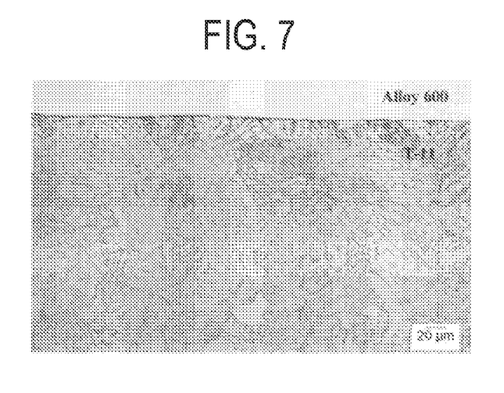
FIG. 7 is photomicrograph of a composite metallic tube formed in accordance with the present invention, showing the interface between the metallic components thereof.

FIG. 7 is a photomicrograph illustrating the material interface of a bi-component metallic tube formed in accordance with the principles of the present invention. Significantly, the present method provides a metallurgical bond between the layers of the components which exhibits a high degree of integrity substantially free of voids of other discontinuity. The illustrated coextruded tube was formed from T-11 steel, and Inconel Alloy 600 (UNS N06600) cladding. The Alloy 600 coating provides significantly better corrosion-resistance than comparable weld overlay cladding. This improved corrosion-resistance is attributed to the elimination of dilution and microsegregation in the coextruded coating. Additional benefits of the coextruded coating, in terms of service performance, are also achieved by better control of coating thickness and surface finish, with reduced residual stresses.

The difference in corrosion performance between coextruded and weld overlay coatings can be attributed to two factors. First, a weld overlay typically contains an additional 10 weight percent of iron, which stems from dilution with the underlying steel substrate, and is always present in any weld overlay coating. The addition of iron results in a corresponding decrease in the chromium content, and often has a detrimental effect on corrosion-resistance. The 10% dilution value represents a lower limit on the dilution level for commercially applied coatings. The dilution level in a field-applied weld overlay coating can often be even higher than this, and a corrosion resistance can be reduced even further as a result. Such dilution effects do not occur with the coextruded coating formed in accordance with the present invention.

Secondly, a weld overlay coating will exhibit microsegregation of alloying elements due to the solidification process in which the dendrite core regions are slightly depleted in alloying elements (e.g. chromium) that are important for corrosion protection. As a result, the corrosion can occur preferentially in the alloy-depleted dendrite core regions. In fact, the uneven inner corrosion scale that can form on a weld overlay coating is indirect evidence of the detrimental effect of microsegregation in the weld overlay. The regions in which the inner scale penetrates deeply into the metal are most likely the alloy-depleted dendrite cores. These regions compromise the integrity of the inner scale and contribute to formation of thick, non-protective scale.

Testing of bi-component tubes formed in accordance with the present invention shows that coextruded coatings can provide significant benefit over weld overlay coatings for corrosion protection in fossil-fired boilers. While weld overlay coatings provide reasonable protection in many coal-fired environments, they have been shown to be susceptible to corrosion-fatigue cracking in some of the more aggressive corrosion and thermal fatigue conditions. Reduction or elimination of this can be achieved by coextruded tubular structures formed in accordance with the present invention, which provide improved corrosion protection and reduced stress levels. As noted, coextruded coatings do not exhibit dilution and microsegregation that compromise corrosion resistance. Additionally, due to the nature of the welding process, it is not possible to deposit weld overlay coatings with uniform and controlled thicknesses. It is common for a field, applied weld overlay coating to exhibit thickness values that can range from approximately 1.5 to 3 mm within a small region. The weld overlay coating also exhibits surface ripples associated with the solidification process, and the valleys of these ripples have been noted to be a source of stress concentration that can contribute to corrosion-fatigue cracking.

In contrast, coextruded coatings have a uniform coating thickness and smooth surface finish that desirably reduces localized stress concentrations that can aggravate the corrosion-fatigue problem.

The present embodiments of the present invention have been practiced with the use of Inconel Alloy 600 metallic material as the outer, cladding component of a bi-component metallic tube. This is a nickel-chromium alloy exhibiting good oxidation resistance at higher temperatures, with good resistance in carburizing and chloride containing environments. Inconel Alloy 600 is designed for use at temperatures up to 2000° F. The high nickel content of the alloy enables it to retain considerable resistance under reducing conditions and makes it resistant to corrosion by a number of organic and inorganic compounds. The nickel content provides excellent resistance to chloride-ion stress-corrosion cracking and also provides excellent resistance to alkaline solutions. The chromium content provides the alloy with resistance to sulfur compounds and various oxidizing environments. The chromium content of the alloy makes it superior to commercially pure nickel under oxidizing conditions.

Experience has shown that Alloys 622, 625, and 33 UNS N06022, UNS N06625, UNS 820033) may also be advantageously employed for such cladding applications. Alloy 625 is attractive because it has a similar CTE to that of the underlying steel substrate, and can therefore help reduce residual stresses that form during both fabrication and service. Alloy 622 can provide slightly improved corrosion-resistance in view of its slightly higher molybdenum concentration. Alloy 33 is attractive because it has higher chromium concentration for corrosion-resistance, and eliminates the need for molybdenum, which can be beneficial for formability.

EXAMPLE

In accordance with the present invention, an explosively-formed billet 10 was produced from an inner, solid cylindrical component 12 bi-component formed from T-11 steel, and an outer component 14, for formation of the outer cladding on a bi-component tubular structure, formed from Inconel Alloy 600 (UNS N06600) nickel-chromium alloy. The billet 10 had a nominal length of 24.0 inches, and a nominal diameter of 6.0 inches with a cladding thickness of 0.28 inches.

Explosive charges were positioned about the exterior of the outer component 14, and were detonated, thereby forming a metallurgical bond at the interface between the inner and outer components 12, 14. An explosively formed billet for practice of the present invention can be obtained from a qualified explosive bonding source.

The composite billet thus formed was thereafter drilled to provide an opening having a nominal diameter of 2.125 inches at the axis of the composite billet. Thereafter, composite billet was heated, by induction heating, to a temperature on the order of 1200° C. for two hours.

Figure 6:
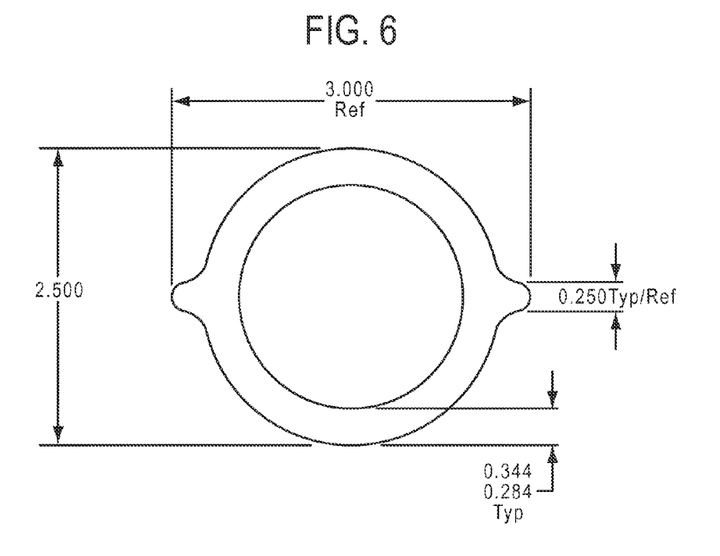
FIG. 6 is an illustration of the cross-section configuration of a bi-component metallic tube embodying the principles of the present invention, having a pair of diametrically opposed projections on the exterior thereof to assist with assembly of the final product.

While being maintained at the elevated temperature, the composite billet was coextrusion-formed on a 2,000 ton extrusion apparatus, at an extrusion ratio, Xr, of about 11.3, to form a composite tube having dimensional features like that shown in FIG. 6. The composite billet formed in accordance with this technique produced a composite tube having a length of approximately 236 inches, and a nominal diameter of 2.5 inches, achieving an approximately 74% yield from the billet 10. The external diameter (O.D.) of the tubing formed varied from 2.528 inches to 2.472 inches, with a wall thickness varying from 0.344 inches to 0.284 inches, and a cladding thickness on the order of 0.070 inches.

From the foregoing, we observe that numerous modifications and variations can be effected without departing from the true spirit and scope of the novel concept of the present invention. It would be understood that no limitation with respect to the specific embodiment illustrated is intended or should be inferred. The disclosure is intended to cover, by the appended claims, all such modifications as well within the scope of the claims.

What is claimed is:

1. A method of making a multi-component, composite corrosion-resistant metallic boiler tube, comprising the steps of:
    forming an extrudable, multi-component billet by providing an inner component formed from a first metallic material, and an outer component formed from a second metallic material, including positioning said inner component within said outer component, and explosively bonding said inner and outer components to form a metallurgical bond at an interface of said components including explosively bonding said outer component to the exterior of said inner component, wherein said second metallic material is alloy UNS N06022, UNS N06600, or UNS R20033 to optimize corrosion-resistance;
    drilling an opening through said inner component of said multi-component billet;
    coextruding said multi-component billet to form a multi-component, composite metallic tube, wherein said composite tube comprises an inner layer formed from said first metallic material, and an outer layer formed from said second metallic material, to thereby form said composite metallic tube with a metallurgical bond at an interface between said inner and outer layers of said composite metallic tube; and
    installing said composite metallic tube in a boiler panel, wherein said second metallic material of said outer layer is exposed to fossil-fired combustion gases.

2. A method of making a multi-component, composite metallic tube in accordance with claim 1, including elevating the temperature of said billet prior to said coextruding step.

3. A method of making a multi-component, composite metallic tube in accordance with claim 2, wherein
    said step of elevating said temperature of said billet includes induction heating said billet.

4. A method of making a multi-component, composite metallic tube in accordance with claim 1, wherein
    said inner and outer components are explosively bonded by positioning explosives exteriorly of said outer component.

5. A method of making a multi-component, composite metallic tube in accordance with claim 1, including
    forming said multi-component tube with a generally cylindrical configuration.

6. A method of making a multi-component, composite metallic tube in accordance with claim 5, including
    forming at least one projection on the exterior of the outer layer of said composite metallic tube during said coextruding step.

7. A method of making a multi-component, composite metallic tube in accordance with claim 6, including
    forming a pair of diametrically opposed projections on the exterior of the outer layer of said composite metallic tube during said extrusion coextruding step.

8. A method of making a multi-component, composite metallic tube in accordance with claim 1, including
    selecting the metallic material of said outer component of said billet to optimize resistance to corrosion from gases produced during coal combustion.

9. A method of making a multi-component, composite metallic tube in accordance with claim 1, wherein
    said multi-component metallic tube is bi-component, with said first inner layer comprising the innermost layer of said tube.

10. A method of making a bi-component, composite metallic tube, comprising the steps of:
    forming an extrudable, bi-component billet by providing an inner component formed from a first metallic material, and an outer component formed from a second metallic material, wherein the metallic material of said, outer component is selected to optimize resistance to corrosion from combustion gases including positioning said inner component within said outer component, and explosively bonding said first and second components to form a metallurgical bond an interface of said components, wherein said second metallic material is alloy UNS N06022, UNS N06600, or UNS R20033;
    drilling an opening through said inner component of said billet;
    elevating the temperature of said billet by induction heating said billet;
    coextruding said bi-component billet to form a bi-component, composite metallic tube having a generally cylindrical configuration, wherein said composite tube comprises an inner layer formed from said first metallic material, and an outer layer formed from said second metallic material, to thereby form said composite tube with a metallurgical bond at an interface between said inner and outer layers of said composite tube; and
    installing said composite tube in a boiler panel, wherein second metallic material is exposed to fossil-fired combustion gases.

11. A method of making a bi-component, composite metallic tube in accordance with claim 10, including
    forming a pair of diametrically opposed projections on the exterior of the outer layer of said bi-component tube during said coextruding step.

12. A method of making a bi-component, composite metallic tube in accordance with claim 10, wherein
    said first metallic material of said inner component comprises steel.

13. A method of making a bi-component, composite metallic tube in accordance with claim 10, wherein
    said second outer layer of said composite tube has a thickness which is between about 1.0% to 5.0% of the diameter of said composite tube.

* * * * *